United States Patent

Seki et al.

[11] Patent Number: 5,461,451
[45] Date of Patent: Oct. 24, 1995

[54] DISTANCE MEASURING DEVICE AND CAMERA HAVING SAME

[75] Inventors: Yoichi Seki; Kazuo Akimoto; Akira Ito; Hironobu Amemiya, all of Chiba, Japan

[73] Assignee: Seikosha Co., Ltd., Tokyo, Japan

[21] Appl. No.: 129,232

[22] Filed: Sep. 29, 1993

[30] Foreign Application Priority Data

Sep. 29, 1992 [JP] Japan ................... 4-259950

[51] Int. Cl.⁶ .................................................. G03B 13/36
[52] U.S. Cl. ................................. 354/402; 354/485
[58] Field of Search ........................... 354/485, 402, 354/476, 478

[56] References Cited

U.S. PATENT DOCUMENTS

| | | |
|---|---|---|
| Re. 31,207 | 4/1983 | Tsunekawa et al. . |
| 4,156,567 | 5/1979 | Ostrowski . |
| 4,224,036 | 9/1980 | Tsunekawa et al. . |
| 4,306,789 | 12/1981 | Yamamoto ........................ 354/485 |
| 4,341,448 | 7/1982 | Toyoda et al. . |
| 4,368,965 | 1/1983 | Nemoto . |
| 4,445,765 | 5/1984 | Yamamoto ........................ 354/485 |
| 4,615,602 | 10/1986 | Eguchi ........................ 354/485 |
| 5,136,326 | 8/1992 | Yokota et al. . |
| 5,181,065 | 1/1993 | Hara ........................ 354/485 |
| 5,258,800 | 11/1993 | Seki et al. . |
| 5,278,607 | 1/1994 | Goto et al. ........................ 354/476 |

*Primary Examiner*—Russell E. Adams
*Attorney, Agent, or Firm*—Jordan and Hamburg

[57] ABSTRACT

A distance measuring device for an automatic focusing camera includes a light receiving lens and a multilayer printed circuit board mounted on a holder. A potting frame is provided on the lens-facing side surface of the printed circuit board. An optical sensor and an IC are both mounted within a space enclosed by the potting frame and simultaneously sealed by a protecting resin. Resistors and capacitors of a distance measuring circuit are mounted on the opposite surface of the printed circuit board. The two surfaces of the printed circuit board are connected to each other via a through hole to construct the distance measuring circuit. The protecting resin transmits light having specified wavelengths. The light reflected from a subject to be photographed is received by the optical sensor after passing through the protecting resin, and the distance to the subject is calculated on the basis of the received light data.

12 Claims, 6 Drawing Sheets

DISTANCE MEASURING DEVICE AND CAMERA HAVING SAME

FIELD OF THE INVENTION

The present invention relates to a distance measuring device and a camera provided therewith, and more specifically to a distance measuring device incorporated in an automatic focusing camera.

BACKGROUND OF THE INVENTION

A light receiving section of a distance measuring device incorporated in a prior art automatic focusing camera will be described hereinbelow, by way of example, with reference to FIG. 9. In the drawing, a holder 20 is formed with a lens holding portion for holding a light receiving lens 21 at one end thereof and a substrate supporting frame 20a for supporting a first printed circuit board 22 at the other end thereof. An optical sensor (PSD) 23 of discrete parts for detecting distance is connected to the first printed circuit board 22, in such a way as to be aligned with an optical axis (the same as the geometric axis) 21a of the light receiving lens 21 through an opening 20b formed in the lens holder 20. One end of a flexible cable 23a (referred to hereinafter as FPC) is connected to the first circuit board 22. The other end of the flexible cable 23a is connected to a second printed circuit board 25 disposed within a cover 24. A distance measuring IC 26 is mounted on this second printed circuit board 25. Other electric parts (e.g., resistors, capacitors, etc.) 27 which constitute the measuring circuit are mounted on this second printed circuit board 25.

In the above-mentioned prior art distance measuring device, since the first printed circuit board 22 for mounting the optical sensor 23 and the second printed circuit board 25 for mounting the distance measuring IC 26 and other parts are both provided, the FPC 23a for connecting both the printed circuit boards 22 and 25 to each other and other members for supporting the second printed circuit board 25 in the holder 20 are inevitably required additionally, thus resulting in a problem in that the number of parts increases. In particular, since the optical sensor 23 and the IC 26 packaged as different discrete parts, respectively, are both used, it is difficult to mount the parts within a small space.

In addition, since the sizes and shapes of the second printed circuit board 25 and the cover 24 must be modified according to the models of cameras to facilitate mounting of these parts into a camera, there exists another problem in that these parts lack interchangeability. As described above, the prior art distance measuring device is poor in camera design freedom and it is difficult to reduce the size thereof.

As mentioned above, the optical sensor 23 and the distance measuring IC 26 packaged as discrete parts are used in order to make it possible for the optical sensor to receive incident light and to shield the IC from light to prevent erroneous operation due to light such as elimination of memory by incident light.

Furthermore, since the optical sensor 23 and the IC 26 are mounted a distance away from each other and connected through the FPC cable 23a, there exists a serious problem in that noise is easily superposed upon signals transmitted between both. Although this problem can be overcome to some extent by the use of a shielding structure, this countermeasure raises another problem in that the structure is further complicated.

SUMMARY OF THE INVENTION

With these problems in mind, therefore, it is a primary object of the present invention to provide a distance measuring device which uses a small number of parts, which is simple in structure and, therefore, low in manufacturing cost, which has high reliability without superposing noise upon the signals transmitted between the optical sensor and the IC device, and which avoids erroneous operation of the IC due to light, and to provide a camera provided therewith.

To achieve the above-mentioned objects, the distance measuring device according to the present invention comprises an optical sensor mounted on a printed circuit board and a bare chip state distance measuring IC face-bonded on an optical sensor side surface of the printed circuit board.

DESCRIPTION OF THE PREFERRED EMBODIMENTS

Figure 1:
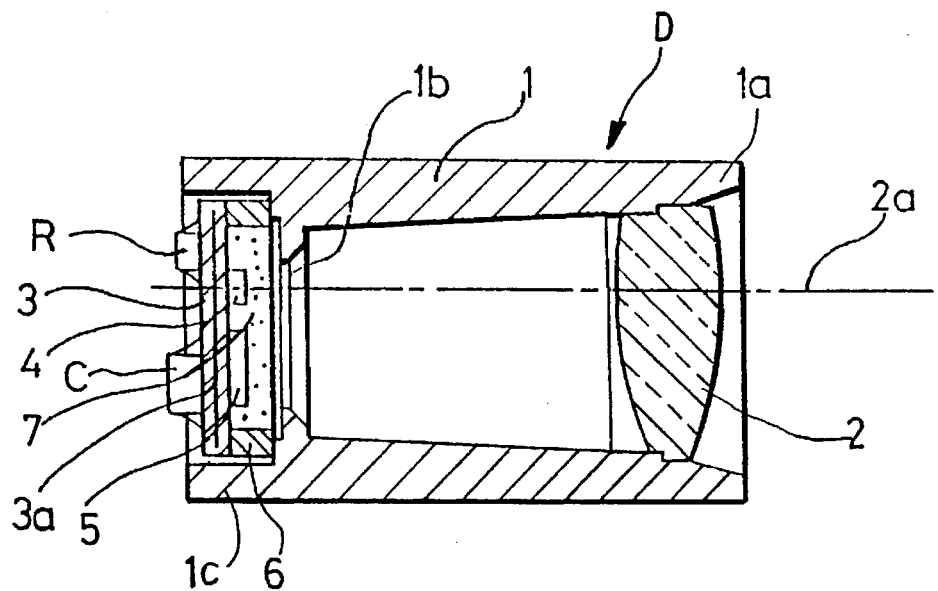
FIG. 1 is a cross-sectional view showing a first embodiment of the distance measuring device according to the present invention.
Figure 1A:
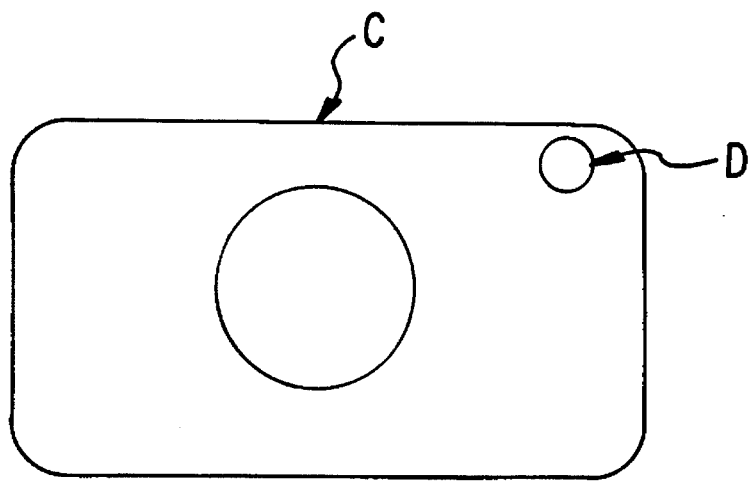
FIG. 1A is a front view of a camera having the distance measuring device according to the present invention.

FIG. 1 shows a first embodiment of a distance measuring device, indicated generally at D, according to the present invention. A light receiving lens 2 is supported at one end of a holder 1 and a printed circuit board 3 is supported at the other end of the holder 1. On the printed circuit board 3, there are mounted electric parts such as a bare chip optical sensor (PSD) 4 for detecting distance, a bare chip distance measuring IC 5, resistors R, and capacitors C, etc. FIG. 1a shows the distance measuring device D used with a camera C.

The holder 1 is formed of a light shading plastic and formed into a cylindrical shape. The holder 1 is formed integral with a lens holding portion 1a on one end thereof and an opening 1b and a board supporting frame portion 1c at the other end thereof.

Figure 2:
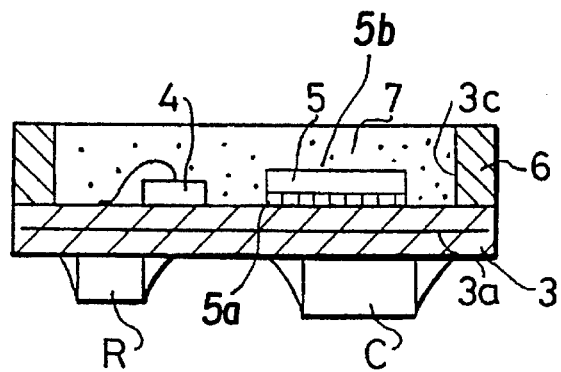
FIG. 2 is an enlarged cross-sectional view showing the circuit block of the first embodiments.
Figure 3:
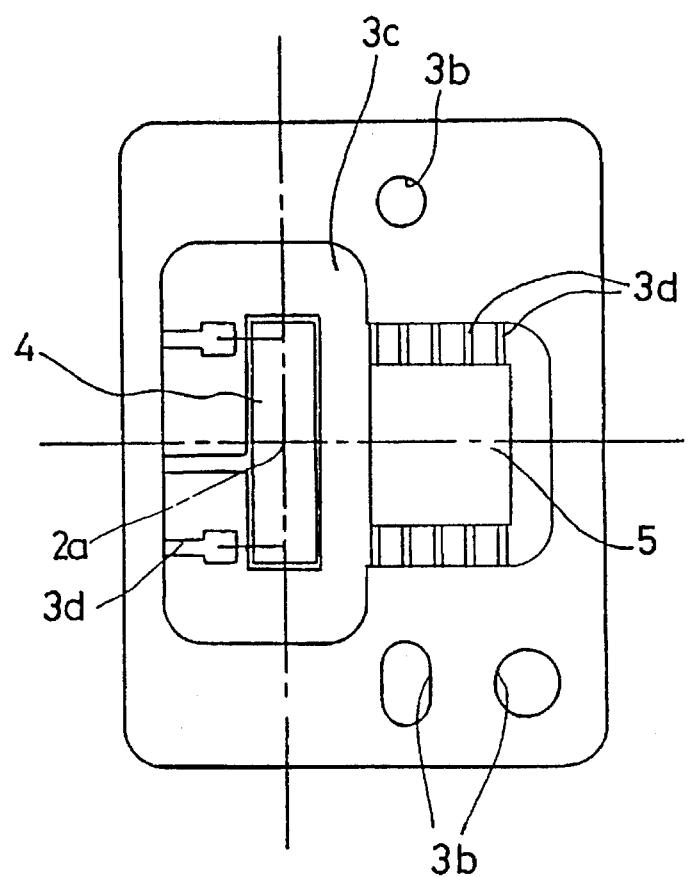
FIG. 3 is an enlarged plan view showing the circuit block shown in FIG. 2, before being filled with a protecting resin.

As shown in FIGS. 2 and 3, the printed circuit board 3 is a multilayer printed circuit board such that a GND layer 3a (an electrode layer to which the ground potential is supplied for providing an electromagnetic shielding effect) is formed within the circuit board and conductive patterns 3d are formed on both the surfaces thereof. Further, mounting holes 3b are formed in the printed circuit board 3. A frame for potting 6 is provided on one surface of the printed circuit board 3 so as to enclose the outer periphery of the board 3. Within a space 3c of the potting frame 6, the optical sensor 4 is mounted and the distance measuring IC 5 is face-bonded and connected with the conductive patterns 3d. Under these conditions, a protecting resin 7 such as epoxy resin which can transmit light having specified wave lengths is filled in the potting frame 6 and then hardened to seal the optical sensor 4 and the IC 5. On the opposite surface of the printed circuit board 3, electric parts such as resistors R, capacitors C, etc., are connected to conductive patterns (not shown) by soldering. The conductive patterns on both surfaces of the printed circuit board 3 are connected via through holes (now shown) formed in the board 3.

Figure 4:
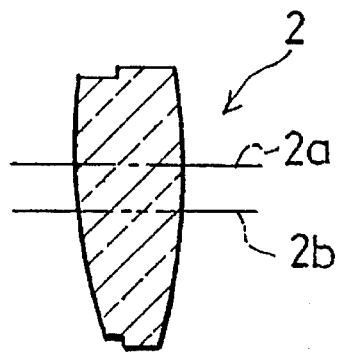
FIG. 4 is an enlarged cross-sectional view showing the light receiving lens of the first embodiment.
Figure 5:
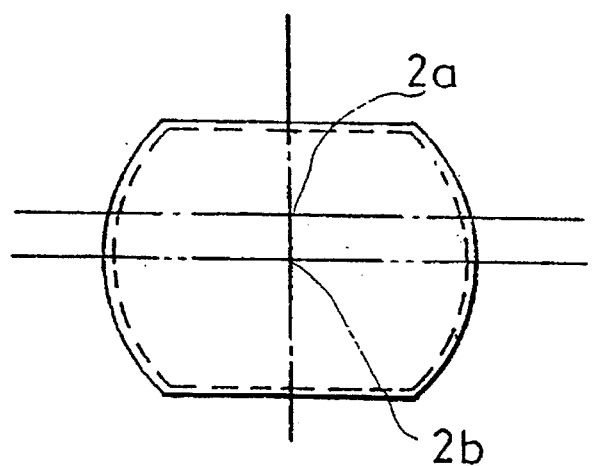
FIG. 5 is an enlarged front view showing the light receiving lens of the first embodiment.

As shown in FIGS. 4 and 5, the light receiving lens 2 of the present embodiment is formed with an asymmetrical shape having a greater thickness at one end than at the other end thereof. This shape may be obtained by cutting off a part from an ordinary symmetrical lens. As a result, the optical axis 2a of the asymmetrical lens 2 is offset from the geometrical axis 2b thereof.

As shown in FIG. 1, when the light receiving lens 2 and the printed circuit board 3 are mounted in the holder 1, the optical sensor 4 is aligned with the optical axis 2a of the light receiving lens through the opening 1b. The IC 5 is face-bonded so that the front surface 5a of the IC 5 is adhered to the printed circuit board 3 and the rear surface 5b faces the incident light. Therefore, the front surface 5a does not receive incident light. The front surface 5a of the IC 5 is, therefore, shaded from the light by the shading portion 1c, thus preventing the IC 5 from being operated erroneously due to light.

Figure 6:
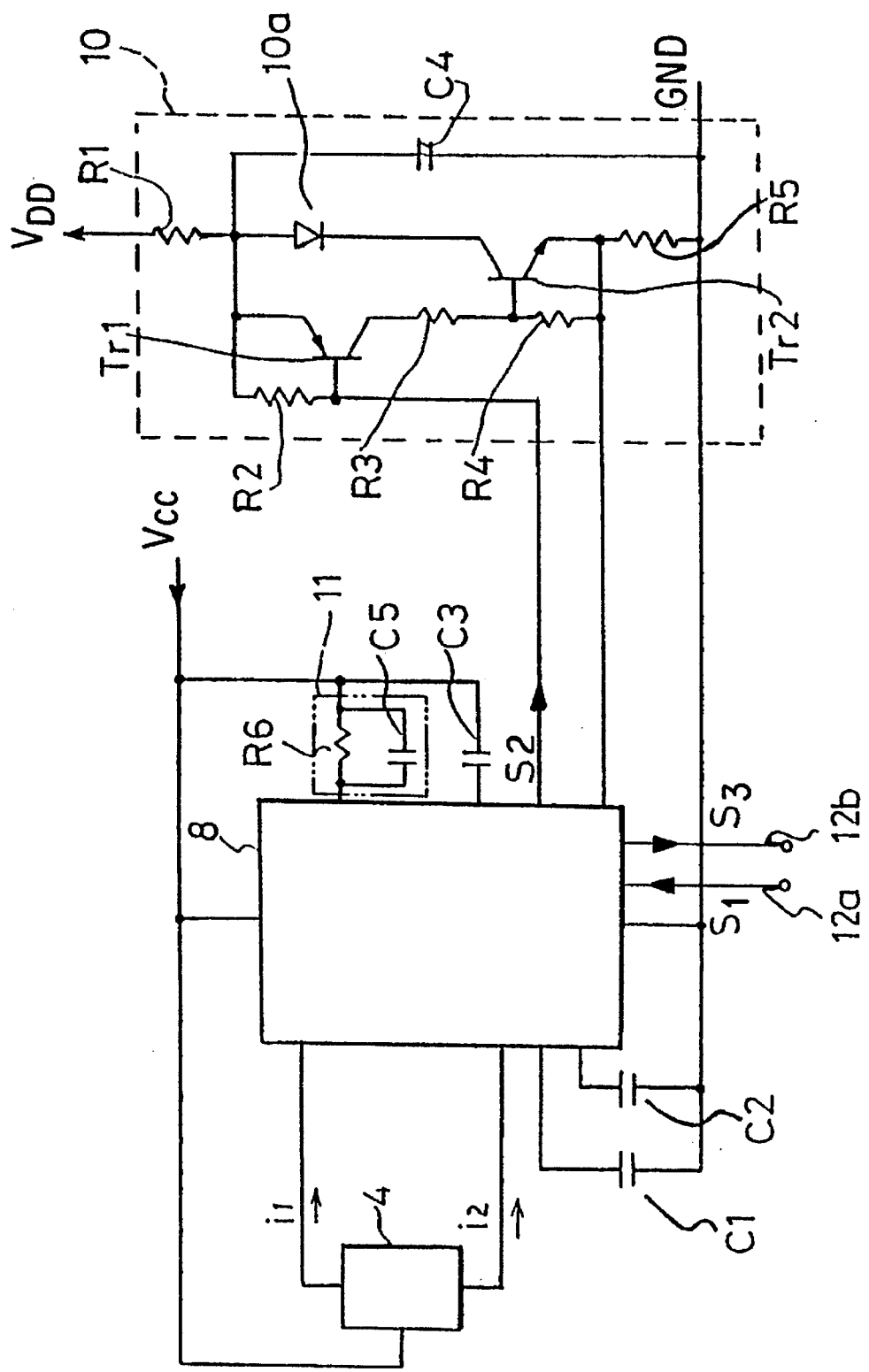
FIG. 6 is a circuit diagram showing the distance measuring circuit of the first embodiment.

The distance measuring circuit will be described hereinbelow with reference to FIG. 6.

A control circuit 8 is comprised of the aforementioned distance measuring IC 5 to which an optical sensor 4, a light emitting means 10, an oscillation circuit 11, capacitors C1, C2 and C3 are connected as shown. The light emitting means 10 is comprised of an LED (light emitting diode) 10a, voltage regulating resistors R1, R2, R3, R4 and R5, transistors Tr1 and Tr2, and a capacitor C4. In this embodiment, the optical parts are so selected that the LED 10a can emit near infrared radiation having wavelengths from 880 to 940 nm, and the optical sensor 4 can receive the near infrared radiation having the same wavelengths as above. The protecting resin 7 is so selected as to transmit the near infrared radiation having the same wavelengths.

The oscillation circuit 11 is a RC circuit composed of a resistor R6 and a capacitor C5, which controls the frequency of a reference clock signal of the control circuit 8. The capacitors C1 and C2 store the steady light intensity level (the light level under ordinary environment in which the near infrared radiation is not emitted) in the form of voltage level, while the capacitor C3 stores the light intensity level of the light reflected by a non-illustrated subject to be photographed, when the near infrared radiation is emitted, also in the form of voltage level. Further, terminals VCC and VDD are connected to a non-illustrated voltage supply, respectively, and a GND terminal is connected to the GND layer 3a shown in FIG. 2. The junction terminals 12a and 12b are connected to a non-illustrated microcomputer provided in the camera body.

The operation of the distance measuring circuit constructed as described above will be explained hereinbelow.

First, when the user depresses a non-illustrated release button of the camera, the microcomputer provided in the camera body applies a distance measurement start signal S1 to the control circuit 8. In response to this start signal S1, the control circuit 8 transmits an activation signal S2 to the light emitting means 10 to turn on the transistors Tr1 and Tr2 of the light emitting means 10, so that the LED 10a emits near infrared radiation. When the near infrared radiation is reflected from a non-illustrated subject to be photographed, the optical sensor 4 receives the reflected radiation and an output signal of the optical sensor 4 is transmitted to the control circuit 8. On the basis of this output signal from the optical sensor 4, the control circuit 8 calculates the distance to the subject to be photographed. In more detail, when the optical sensor 4 (see FIG. 2) is of the PSD (position sensitive detector) type, the output currents i1 and i2 are applied to the control circuit 8 and the control circuit 8 calculates the distance to the subject on the basis of these output currents i1 and i2. A distance data signal S3 obtained as described above is transmitted to the microcomputer in the camera body, so that the microcomputer drives a non-illustrated telescopic lens moving mechanism according to the distance data signal S3 for automatic focusing operation.

Further, in practice, since the steady light level is held in the capacitors C1 and C2, the light data based on the steady light level is subtracted from the light data received by the optical sensor 4 to obtain light data based upon only the reflected light of the near infrared radiation emitted by the light emitting means 10 so that the control circuit 8 can calculate the distance more accurately.

In addition, in practice, the near infrared radiation is emitted several times, and the distance is calculated on the basis of a plurality of light data received by the optical sensor 10 for obtaining more accurate data. In more detail, the control circuit 8 applies a plurality of start signals to the light emitting means 10 at regular time intervals on the basis of a reference clock signals whose frequency is controlled by the oscillation circuit 11 so that the LED 10a transmits the near infrared radiation intermittently.

Figure 7:
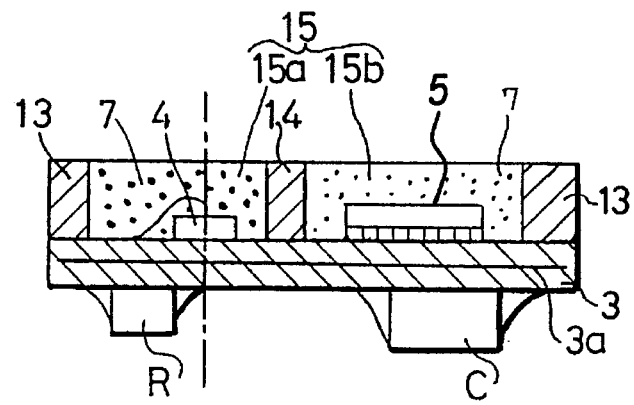
FIG. 7 is an enlarged cross-sectional view showing the circuit block of a second embodiment.
Figure 8:
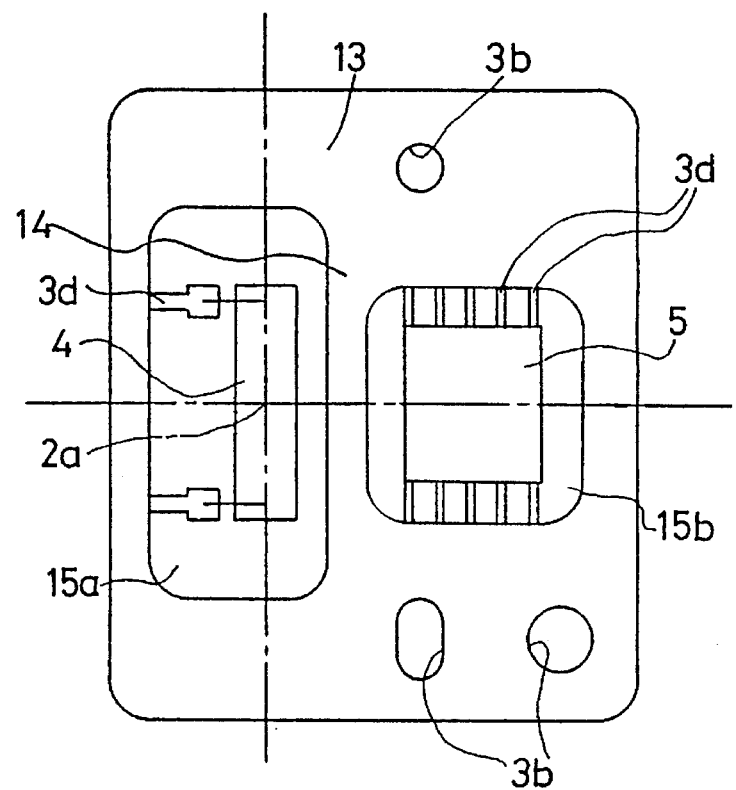
FIG. 8 is an enlarged plan view showing the circuit block shown in FIG. 7, before being filled with two different protecting resins.

A second embodiment of the light receiving means of the distance measuring device according to the present invention will now be described hereinbelow with reference to FIGS. 7 and 8.

The printed circuit board 3 is a multilayer printed circuit board in the same manner as in the embodiment of FIGS. 1–6. A potting frame 13 is provided on one surface of the printed circuit board 3 so as to enclose the periphery of the board 3, and additionally a partition wall 14 is formed integral with the potting frame 13 so as to cross the frame 13 at roughly the middle portion thereof. The space 15 within the potting frame 13 is divided into two space regions 15a and 15b by this partition wall 14. A bare chip optical sensor 4 is mounted in the first space region 15a and a bare chip distance measuring IC 5 is face-bonded in the second space region 15b, respectively, for connection to the conductive patterns 3d. The first and second space regions 15a, 15b are filled with a protecting resin 7 which can transmit near infrared radiation in the same way as in the first embodiment, and the protecting resin 7 is hardened to seal the optical sensor 4 and the IC 5.

On the opposite surface of the printed circuit board 3, resistors R, capacitors C, etc., are mounted on the non-illustrated conductive patterns of the printed circuit board 3, and both the conductive patterns on both surfaces of the board 3 are connected to each other via non-illustrated through holes. The construction other than the above is substantially the same as that of the embodiment of FIGS. 1–6.

In a conventional construction, an IC is bonded to face the incident light so that it is necessary to fill the space region on which the optical sensor is mounted with a first protecting resin which can transmit near infrared radiation and to fill the space region on which the IC is mounted with a second protecting resin which can shade light. Thus, two kinds of resin are used.

In the present invention, however, only one kind of resin which can transmit near infrared radiation is used. It is possible for the optical sensor 4 to receive the near infrared radiation and, therefore, detect the distance. The IC 5 is face-bonded so that the front surface does not receive the incident light so that the IC 5 is prevented from erroneous operation.

In the distance measuring device according to the present invention, since the optical sensor 4 and the IC 5 can be mounted on the same printed circuit board 3, it is possible to reduce the mounting area and, therefore, minimize the size of the distance measuring device.

The IC 5 is connected to the conductive patterns 3d by face-bonding without wire-bonding so that the mounting area can be reduced even more. In addition, since the second printed circuit board, the holding member for the second circuit board, and the flexible cable are all unnecessary, it is possible to reduce the number of the parts and, therefore, the cost of the device. In particular, since the optical sensor 4 and the IC 5 can be mounted on the printed circuit board 3 as bare chips, it is possible to simplify the assembly work while reducing the size and the thickness of the device.

In the present invention, it is possible to assemble almost all of the parts of the light receiving section, as a unit, to the holder 1 having substantially the same shape as the prior art holder without using another member such as a cover. Therefore, the device is simple in structure and compact in shape. In addition, since the light receiving section of the distance measuring device can be provided for a camera by attaching only the holder to the camera, it is possible to provide a distance measuring device of excellent interchangeability, without need of design modifications according to the various camera models, with the result that it is possible to markedly reduce the production cost of cameras in the case of diversified camera production. Further, it is also possible to form the member for supporting the light emitting means 10 integral with this holder, and to assemble the light emitting means 10 and light receiving section as shown in FIG. 1 as a single unit.

In the distance measuring device of the present invention, since the optical sensor 4 is positioned in close vicinity of the IC 5, it is possible to reduce electric noise superposed upon the signals transmitted between the two. In addition, when a ground potential level layer 3a is provided between the optical sensor side surface and the opposite side surface, it is possible to further reduce the electric noise transmitted between the two surfaces by the electromagnetic shielding effect upon both the surfaces thereof.

Figure 9:
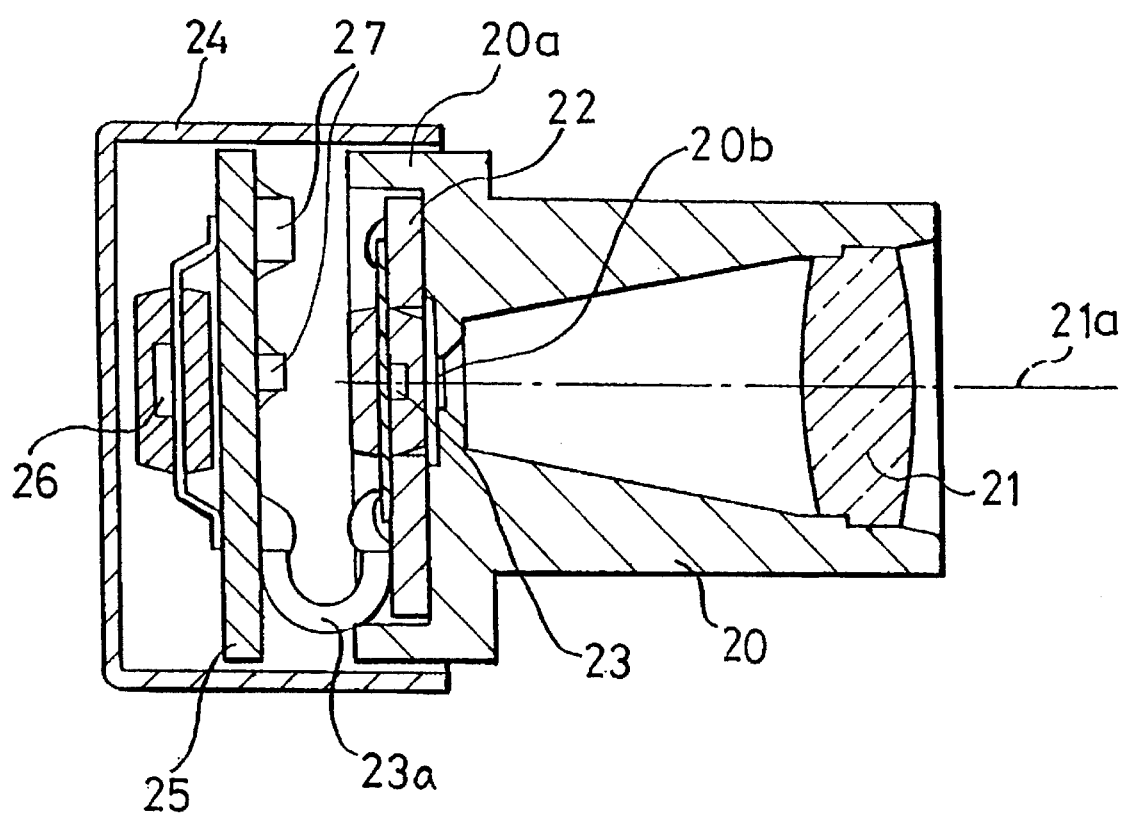
FIG. 9 is a cross-sectional view showing a prior art distance measuring device.

In the above-mentioned two embodiments, the asymmetrical lens 2 is adopted in such a way that the optical axis 2a thereof is offset from the geometric axis 2b thereof; that is, in such a way that even if the optical sensor 4 is mounted at a position offset away from the middle portion of the printed circuit board 3 (e.g., on the left side in FIGS. 2 and 3), the optical axis 2a of the lens 2 is aligned with the optical sensor 4. Therefore, it is possible to arrange the optical sensor 4 on the same surface as the IC 5, without placing the optical sensor at the central position of a relatively large printed circuit board or to divide the printed circuit board into two boards as in the case of the prior art light receiving section of the distance measuring device as shown in FIG. 9.

In the above-mentioned embodiments, although the light emitting means 10 emits near infrared radiation having wavelengths from 880 to 940 nm, it is, of course, possible to use a light emitting means 10 which emits light of different wavelengths. In this case, it is, of course, necessary to use an optical sensor 4 and a protecting resin 7 which can receive and transmit light of the same wavelengths as those of the light emitting means 10. Furthermore, the present invention is applicable to a passive distance measuring device such that distance is measured on the basis of only external light without use of any internal light emitting means.

In the distance measuring device according to the present invention, since the optical sensor is mounted on the printed circuit board and the bare chip distance measuring IC is face-bonded on the same surface as the optical sensor on the printed circuit board, it is possible to shield the bare chip IC from light and prevent the IC from erroneous operation. Further, it is possible to reduce the mounting area and, therefore, to reduce the size and the thickness of the measuring device.

Further, in the present invention, the optical sensor and the IC are mounted close to each other so that electric noise is reduced and reliability is improved.

What we claim is:

1. A camera comprising a distance measuring device, said distance measuring device comprising a holder means for holding a lens, a printed circuit board supported by said holder means, said printed circuit board having a side, an optical sensor mounted on said side of said printed circuit board, and a bare chip distance measuring IC bonded to said side of said circuit board, on which said optical sensor is mounted.

2. A distance measuring device comprising:

a printed circuit board having two surfaces;

an optical sensor mounted on one of said surfaces;

a bare chip distance measuring IC bonded on said one surface;

circuit components mounted on the other of said two surfaces; and conductive patterns on said one and on said other surface connecting said optical sensor, said IC and said circuit components.

3. A distance measuring device according to claim 2 further comprising a potting frame means about said one surface defining an enclosure, a protective resin in said enclosure, said protective resin sealing said optical sensor and said IC.

4. A distance measuring device according to claim 3 wherein said resin has the property to transmit near infrared radiation.

5. A distance measuring device according to claim 3 further comprising a partition wall integral with said potting frame means to divide the enclosure into two sections, said optical sensor being mounted in one of said sections, said IC being mounted in the other section.

6. A distance measuring device according to claim 2 further comprising a holder means supporting said printed circuit board, and a lens supported by said holder means.

7. A distance measuring device according to claim 6 wherein said lens has an optical axis aligned with said optical sensor.

8. A distance measuring device according to claim 6 wherein said lens has a geometrical axis and an optical axis, said geometrical axis being offset from said optical axis.

9. A distance measuring device according to claim 2 wherein said printed circuit board comprises a ground potential level layer between said surfaces.

10. A distance measuring device according to claim 2 wherein said bare chip distance measuring IC comprises an unencapsulated chip.

11. A distance measuring device according to claim 2 wherein said bare chip distance measuring IC comprises a chip which can be adversely affected by light.

12. A camera comprising a distance measuring device, said distance measuring device comprising a holder means for holding a lens, a printed circuit board supported by said holder means, said printed circuit board having two surfaces, an optical sensor mounted on one of said surfaces, a base chip distance measuring IC mounted on said one surface, circuit components mounted on said other surface, and conductive patterns on said one and said other surfaces connecting said optical sensor, said IC and said circuit components.

* * * * *